July 21, 1959
C. H. WIKLUND
2,895,242
ADAPTER FRAME
Filed May 29, 1957
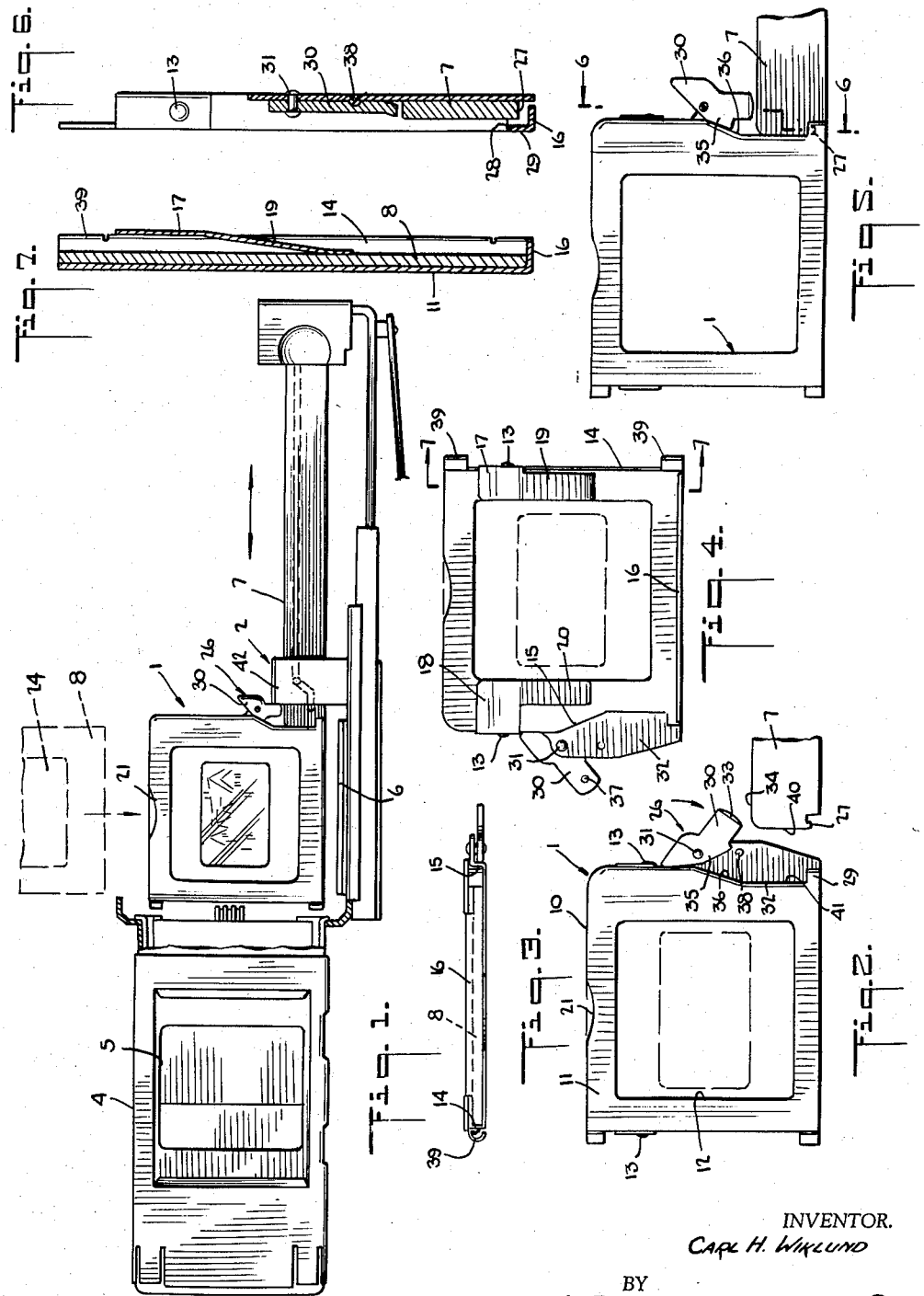
INVENTOR.
CARL H. WIKLUND
BY
ATTORNEY United States Patent Office 2,895,242
Patented July 21, 1959

2,895,242

ADAPTER FRAME

Carl H. Wiklund, New Rochelle, N.Y., assignor to Airequipt Manufacturing Co., Inc., New Rochelle, N.Y., a corporation of New York Application May 29, 1957, Serial No. 662,366

5 Claims. (Cl. 40—63)

The present invention relates to a means for exhibiting transparent picture slides and more particularly to a slide adapter frame for adapting magazine-type slide changers for use as hand-loaded slide viewers.

Photographs in the form of transparent slides mounted in cardboard or metal holders are now commonly exhibited by slide projectors or viewers. In order to provide for convenient, orderly and rapid exhibition, the slide changers are very often provided with slide magazines in which the slides are stored in order and which present the slides successively for viewing in cooperation with the slide projector or viewer slide changing mechanism. In exhibiting slides using magazines, it is often desirable to insert additional slides into the sequence without disturbing the regular magazine arrangement of the slides or to add a few slides without arranging them in magazines and without removing the slide changing mechanism from the slide viewer or projector.

The adaptor frame of the present invention provides for the viewing of individual slides while using the slide changing mechanism without a magazine. The frame is particularly adapted for use with the slide changers shown in my Patent No. 2,711,602 or in my copending application No. 611,950, filed September 25, 1956; however, the adapter may be used with other magazine-type slide changers.

Accordingly, an object of the present invention is to provide means to adapt magazine-type slide changers for hand operation.

Another object of the present invention is to provide an improved picture slide adapter frame.

Another object of the present invention is to provide a slide adapter frame for use on magazine-type slide changers.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a front elevational view of the adapter frame according to the present invention removably connected to a slide changing mechanism;

Fig. 2 is a front elevational view of the slide frame;

Fig. 3 is a top plan view of the adapter frame;

Fig. 4 is a rear elevational view of the adapter frame of Fig. 2;

Fig. 5 is a front elevational view of the adapter frame attached to a slide changer transfer member;

Fig. 6 is a sectional view taken along line 6—6 of Fig. 5; and

Fig. 7 is a sectional view taken along the line 7—7 of Fig. 4.

The slide adapter 1 is illustrated in Fig. 1 fastened in position in a slide changer 2 such as the slide changer which is described more fully in my Patent No. 2,711,602. The slide changer 2 forms no part of the present invention and will be described herein only to the extent necessary to explain the use of the slide adapter 1. The slide changer 2, which is described more fully in my above-mentioned patent, comprises a housing 4 adapted to be fitted into the optical system of a slide projector or slide viewer, and aperture 5 in the housing exposes slides to the optical system as the slides are successively moved into the aperture 5 from a magazine positioned on a magazine support 6. In the normal operation of the slide changer 2, slides from the magazine are moved into the aperture 5 of the housing 4 by horizontal reciprocating movement of the slide transfer member 7. Fig. 1 shows the slide changer 2 with the magazine removed from magazine support 6 and with the slide adapter frame 1 applied to the slide transfer member 7. The means for removably attaching the slide adapter frame 1 to the slide transfer member 7 will be more fully described below in connection with a description of the adapter frame 1 as illustrated in detail in Figs. 2-7. Individual slide holders 8 are inserted and removed through the open top of the slide adapter 1 and the slide adapter 1 moves the slides into position at aperture 5 when the transfer member 7 is moved inwardly toward the magazine support 6.

The slide adapter frame 1 comprises a frame member 10 which is preferably stamped from a piece of relatively thin metal and which comprises a relatively flat face portion 11 having a slide exposing aperture 12 therein and having end walls 14 and 15 and bottom wall 16 formed integrally therewith by the stamping operation. Attached to the end walls 14 and 15 by suitable rivets 13 are flexible slide holder clips 17 and 18. The slide clips 17 and 18 have resilient slide engaging fingers 19 and 20, respectively, which are adapted to releasably engage the slide holders 8, which are inserted into the slide adapter frame 1 through the open top portion defined generally by the tops of the adapter face portion 11, the end walls 14 and 15, and the slide holder clips 17 and 18. The clips 17 and 18 thus form expansible channels at spaced edges of the frame 10 to accommodate slide holders 8. When the slide adapter frame 1 has been positioned in the slide changer 2 as seen in Fig. 1, slide holders 8 may be inserted in and removed from the adapter frame 1 through its open top. A finger notch 21 at the top of the adapter face portion 11 facilitates the removal of the slide holders 8 from the slide adapter frame 1. The slides 24 which are viewed in the slide viewer are normally mounted in a slide holder 8 which comprises a cardboard or a metal frame with or without glass covers. The slide holders 8 are furnished in standard sizes for use with slide changers 2 and the adapter frame 10 is proportioned to accept a standard slide holder.

The adapter frame 1 is removably attached to the slide transfer member 7 by the fastener 26. A preferred embodiment of the fastener 26 is illustrated in Figs. 2-7. The slide transfer member 7 has a slide engaging projection 27 formed at its inner end. This projection 27 normally engages a recess formed at the outer, lower corner of the slide frames provided in the slide changer magazines. In the slide adapter frame of the present invention, a recess 28 is provided at the lower corner of the adapter frame 1 preferably by stamping a raised portion 29 in the lower edge of the side wall 15 and by forming the recess 28 in the top of the raised portion 29 (Fig. 6). In order to lock the projection 27 in the recess 28, a latch member 30 is pivotally mounted at 31 on an integral extension 32 of the side wall 15. The latch 30 has a lower locking surface 33 which is moved adjacent to the top 34 of the slide transfer member 7 when the latch 30 is moved to its vertical or closed position as seen in Fig. 5. A slight clearance is provided between locking surface 33 and the top 34 of the slide transfer member 7. The latch 30 thus prevents the disengagement of projection 27 from slot 28 while at the same time allowing the frame 1 to adjust its position on the slide transfer member 7 during its travel to and from the viewing position. A stop surface 35 on the edge of the latch 30 engages the inclined portion 36 of the wall 15 to orient the latch 30 in its closed position. The latch 30 is releasably locked in its closed position by cooperating detent 37 in the latch 30 and a projection 38 in the side wall extension 32. In order to release the adapter frame 1 from the slide transfer member 7, the latch 30 is rotated to its extreme counterclockwise position as seen in Fig. 2.

In forming the side walls 14 of the adapter frame 1, projecting tabs are preferably left at the upper and lower edges and these are bent into semicircular guide members 39 (Fig. 3) which help to guide the adapter frame 1 into the housing 4 after a slide holder 8 has been positioned therein and the slide transfer member 7 is moved inwardly on the slide changer 2.

The adapter frame 1 is most easily applied to the slide transfer member 7 by inserting the adapter frame 1 partly into the housing 4 when the slide transfer member 7 is in its completely withdrawn or outward position. Thereafter, the slide transfer member is moved a short distance towards the adapter frame 1 so that the projection 27 may be seated in the recess 28 and so that the latch 30 may be swung to its closed position without interference from the slide transfer guide member 42. In this position the adapter frame 1 is supported by the transfer member 7 above the magazine support 6 and in line with the housing 4 so that the adapter frame 1 may be inserted into and withdrawn from the housing 4 with a relatively easy sliding motion of the transfer member 7. When the adapter frame 1 is attached to the transfer member 7 and is in its slide holder receiving position as seen in Fig. 1, the lower portion of the latch 30 preferably engages the slide transfer guide member 42 to firmly hold the latch 30 in its locked position during the insertion and removal of the slide holders 8.

It will be seen that the present invention provides a novel adapter frame which adapts magazine-type slide changers so that they may be used in exhibiting individual slides in addition to their use with their slide magazines. The adapter frame is relatively simple and is easily attached to the slide changer so that individual slides may be inserted as desired into a showing of a group of magazine mounted pictures without the removal of the slide changer from the slide projector or slide viewer. The adapter frame in its preferred form comprises a minimum number of parts and is thus easily manufactured and is extremely durable. The adapter frame is also suited for use with slide holders of varying widths.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A slide adapter frame for use with a slide changer having a reciprocably mounted slide transfer member with a projection thereon adapted to engage a recess in slide holders to move them into and out of a slide viewing position comprising the combination of a frame, slide holder engaging means on said frame adapted to removably mount a slide holder on said frame, a recess at one edge of said frame positioned to engage the projection on said slide transfer member, and a locking means adapted to removably lock the slide adapter frame in place on the slide transfer member comprising a latch member pivotally mounted on said frame in spaced relationship to said recess and having a locking surface thereon positioned to occupy a first position slightly spaced from a portion of the slide transfer member opposite the projection when the projection is inserted into said recess whereby the latch member removably locks the projection in the recess and positioned to occupy a second position remote from the slide transfer member to permit removal of the slide adapter frame therefrom.

2. The slide adapter frame as defined in claim 1 in which said latch means has a removable locking means comprising a cooperating projection and detent, one of which is formed on said latch and the other of which is formed on said frame.

3. A slide adapter frame for use with a slide changer having a reciprocably mounted slide transfer member with a projection thereon adapted to engage a slide holder to move it into and out of a slide viewing position comprising the combination of a relatively thin rectangular metal plate having a slide exposing aperture in its central portion and slide holder positioning walls on its ends and bottom, resilient channel forming members adjacent to the two opposite end walls adapted to resiliently hold a slide holder against said metal plate, a recess formed in the lower portion of one end wall adapted to receive the projection on the slide transfer member, a latch means pivotally mounted on the said one end wall above said recess and adapted to be swung from a first position adjacent to said transfer member to a second position remote from the transfer member to removably lock the transfer member projection into said recess when the latch means is in its first position.

4. The slide adapter frame as defined in claim 3 in which said latch means has a removable locking means comprising a cooperating detent and projection, one of which is formed on said latch and the other is formed on said one end wall.

5. A slide adapter frame for use with a slide changer having a reciprocably mounted slide transfer member with a projection thereon adapted to engage a recess in slide holders to move them into and out of a slide viewing position comprising the combination of a frame, slide holder engaging means on said frame adapted to removably mount a slide holder on said frame, a recess at one edge of said frame positioned to engage the projection on said slide transfer member, and a locking means adapted to removably lock the slide adapter frame in place on the slide transfer member comprising a latch member mounted on said frame in spaced relationship to said recess and having a locking surface thereon positioned to occupy a first position slightly spaced from a portion of the slide transfer member opposite the projection when the projection is inserted into said recess whereby the latch member removably locks the projection in the recess and positioned to occupy a second position remote from the slide transfer member to permit removal of the slide adapter frame therefrom.

References Cited in the file of this patent

UNITED STATES PATENTS

| | | |
|---|---|---|
| 1,178,461 | Tilley et al. | Apr. 4, 1916 |
| 1,679,928 | Birdsall | Aug. 7, 1928 |
| 2,682,722 | Waller et al. | July 6, 1954 |